United States Patent

Quach

(10) Patent No.: US 7,308,510 B2
(45) Date of Patent: Dec. 11, 2007

(54) METHOD AND APPARATUS FOR AVOIDING LIVE-LOCK IN A MULTINODE SYSTEM

(75) Inventor: Tuan M. Quach, Fullerton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/431,871

(22) Filed: May 7, 2003

(65) Prior Publication Data

US 2004/0225755 A1 Nov. 11, 2004

(51) Int. Cl.
*G06F 3/00* (2006.01)
*G06F 13/00* (2006.01)

(52) U.S. Cl. ............... 710/6; 710/20; 710/52; 710/112

(58) Field of Classification Search ........... 710/5–6, 710/52–58, 31–39, 100, 107, 112–117, 263, 710/305, 308; 711/114, 122, 141, 147, 158, 711/167
See application file for complete search history.

(56) References Cited

U.S. PATENT DOCUMENTS

| | | | |
|---|---|---|---|
| 3,964,054 A * | 6/1976 | Annunziata et al. ........ 711/122 |
| 5,006,982 A * | 4/1991 | Ebersole et al. ............ 710/263 |
| 5,930,485 A * | 7/1999 | Kelly .......................... 710/112 |
| 5,931,924 A * | 8/1999 | Arimilli et al. ............... 710/41 |
| 5,935,234 A * | 8/1999 | Arimilli et al. ............. 710/244 |
| 6,029,219 A * | 2/2000 | Michizono et al. ......... 710/111 |
| 6,286,068 B1 * | 9/2001 | Arimilli et al. ............. 710/107 |
| 6,374,323 B1 * | 4/2002 | Stracovsky et al. ............ 711/5 |
| 6,449,702 B1 * | 9/2002 | Witter et al. ................ 711/158 |
| 6,526,484 B1 * | 2/2003 | Stacovsky et al. .......... 711/158 |
| 6,542,921 B1 * | 4/2003 | Sager ......................... 718/108 |
| 6,625,678 B1 * | 9/2003 | Koguchi ...................... 710/120 |
| 6,629,220 B1 * | 9/2003 | Dyer .......................... 711/158 |
| 6,658,447 B2 * | 12/2003 | Cota-Robles ............... 718/103 |

* cited by examiner

*Primary Examiner*—Christopher Shin
(74) *Attorney, Agent, or Firm*—Blakely, Sokoloff, Taylor & Zafman LLP

(57) ABSTRACT

A reordering priority to grant higher priority for a request over a response when a predetermined condition is detected for live-lock prevention is discussed. Specifically. A a circuit and flowchart for preventing a live lock situation is discussed without a need for a bus converter. In one example, a detection of a PRETRY response in a response queue is analyzed.

12 Claims, 4 Drawing Sheets

METHOD AND APPARATUS FOR AVOIDING LIVE-LOCK IN A MULTINODE SYSTEM

BACKGROUND OF THE INVENTION

1. Field of the Invention

The present invention relates to improving efficiency of a multinode system by preventing live-lock situations by reordering priority between a request and response.

2. Description of the Related Art

Typically, a multinode system grants higher priority to a response rather than a request for preventing dead-lock when a channel is shared between a request and a response. However, a live-lock situation may result if a response is always granted a higher priority than a request.

FIG. 1 illustrates a typical live-lock situation. The vertical arrows designate various nodes within a multinode system. For example, node A, C, D, and a Home node, as well as a scalability port switch (SPS).

The SPS receives a Port Read Line Data (PRLD) request that is a snoop filter miss. As a result, a Port Snoop Invalidate (PSNRI) response is returned to the request node and a Port Memory Read (PMR) is scheduled to send to the Home node for a data read. However, back pressure occurs in the PMR because it is unable to accept the request due to insufficient space to store the request for processing. Meanwhile, a Port Read Invalidate Line (PRIL) request for the same cache line requested by the PRLD arrives at the SPS from another node. Thus, the SPS retries the PRIL because it conflicts with the PRLD for the same cache line. Therefore, the response channel is selected for returning PRETRY response and the requesting node retries the PRIL request after receiving the PRETRY. Subsequently, the SPS retries the PRIL while more requests to the same cache line continue to arrive from other nodes. Thus, the Home node releases the back pressure. However, the request channel is not selected for PMR because the response channel has been selected for handling multiple PRETRY's. Therefore, the pending PRLD creates a conflict scenario, "live-lock", and where the requests to the same cache line are continuously retried and results in new requests not being serviced and eventually leading to systems time-out

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

The present invention relates to improving efficiency of a multinode system by preventing live-lock situations by reordering priority between a request and response. Specifically, a method and apparatus for reordering priority to grant higher priority for a request over a response when a predetermined condition is detected for live-lock prevention.

An area of current technological development relates to improving efficiency of multinode systems by determining priority of requests and responses. Typically, a multinode system grants higher priority to a response rather than a request for preventing dead-lock when a channel is shared between a request and a response. The reason for dead-lock is because under some scenarios where requests from some nodes continue to be processed, but the responses that are needed for new requests in other nodes can not be returned. As previously described, a live-lock situation may result if a response is always granted a higher priority than a request.

Figure 1:
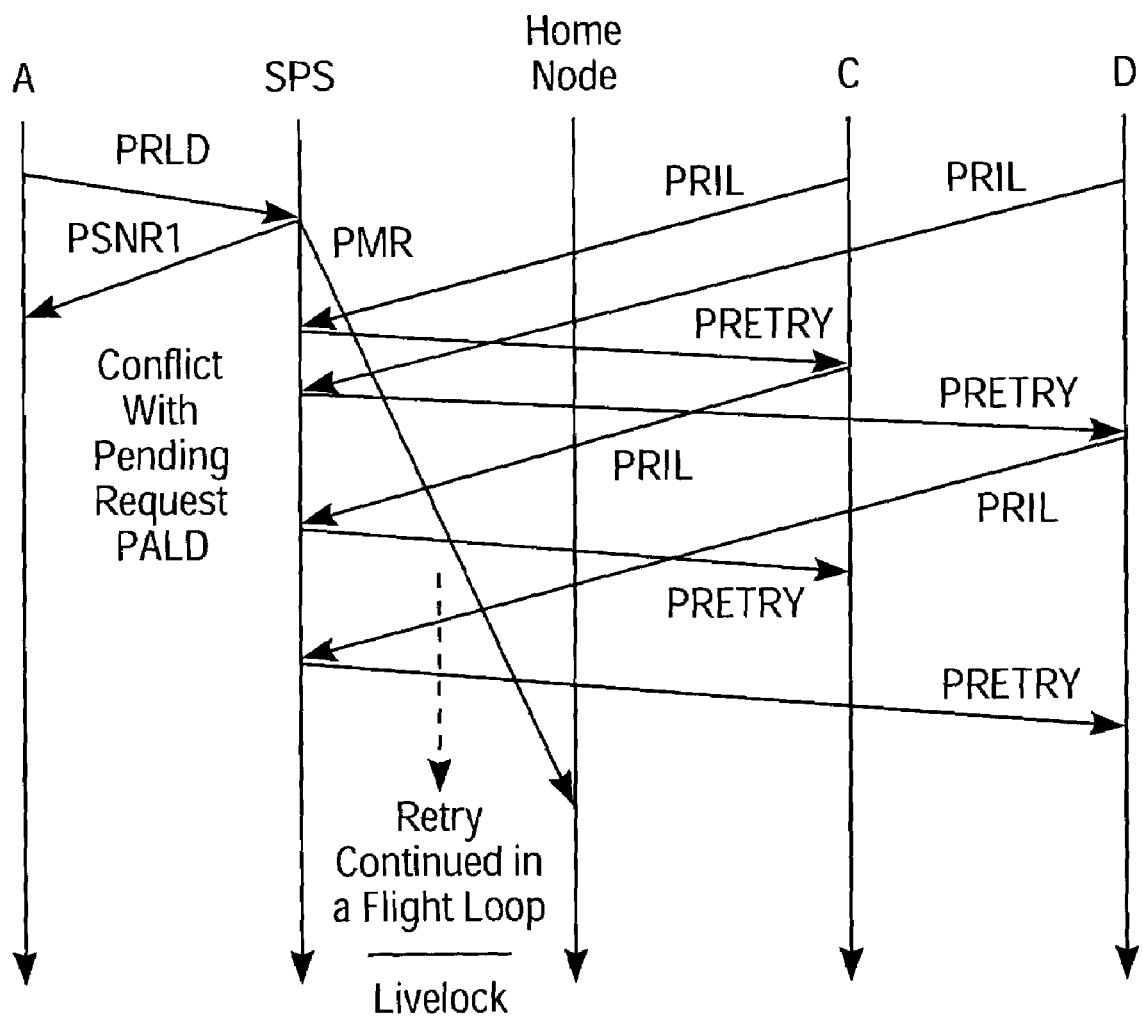
FIG. 1 illustrates a timing diagram of the prior art.
Figure 2:
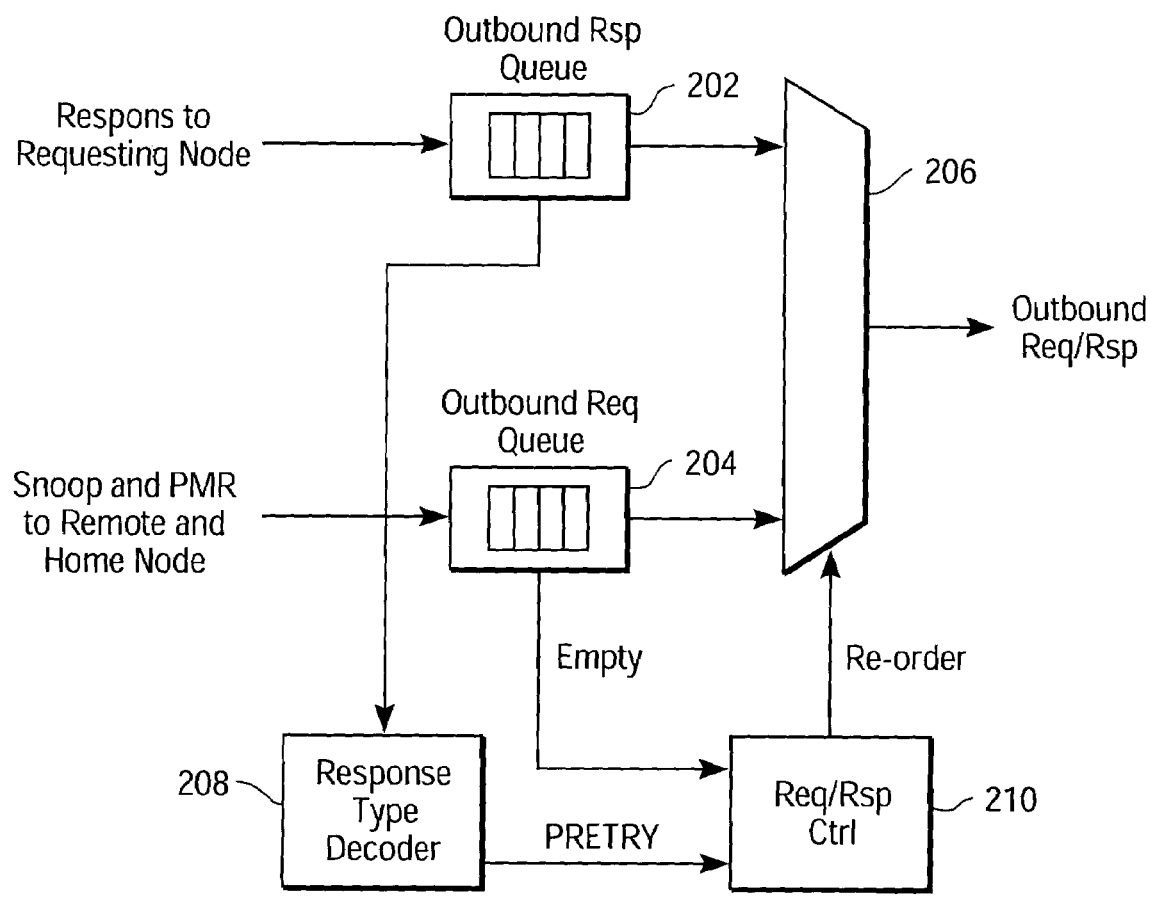
FIG. 2 illustrates an apparatus in accordance with an embodiment.

FIG. 2 illustrates a block diagram 200 utilized by an embodiment of the present invention. The block diagram facilitates a reordering logic by detecting a PRETRY response in a response queue. Then, the block diagram reorders the priority and grants higher priority for the PMR over the PRETRY response. Thus, the PMR proceeds for processing and is no longer pending. Furthermore, a new request to the same cache lines proceeds for processing without the need for being retried. In one embodiment, the reordering logic is incorporated within a scalability port switch (SPS) of a chipset.

The block diagram comprises an outbound response queue 202, an outbound request queue 204, a multiplexer 206 coupled to a request/response channel, a response type decoder 208, and a control logic 210. The outbound response queue 202 stores responses to requesting nodes. In contrast, the outbound request queue 204 stores requests for snoops and PMRs to remote and home nodes.

The response type decoder 208 detects whether a PRETRY response exists within the outbound response queue 202. If so, the control logic 210 grants higher priority to allow the outbound request queue access to the request-response channel if a PRETRY response is the first entry in the outbound response queue to be processed, "at the top of the queue" and the outbound request queue is not empty As a result of the reordering priority to grant higher priority to the outbound request queue, the PMR is sent and the corresponding PRLD is completed. Thus, the reordering precludes the PRETRY live-lock situation. This is also illustrated in connection with the description of FIG. 3.

Figure 3:
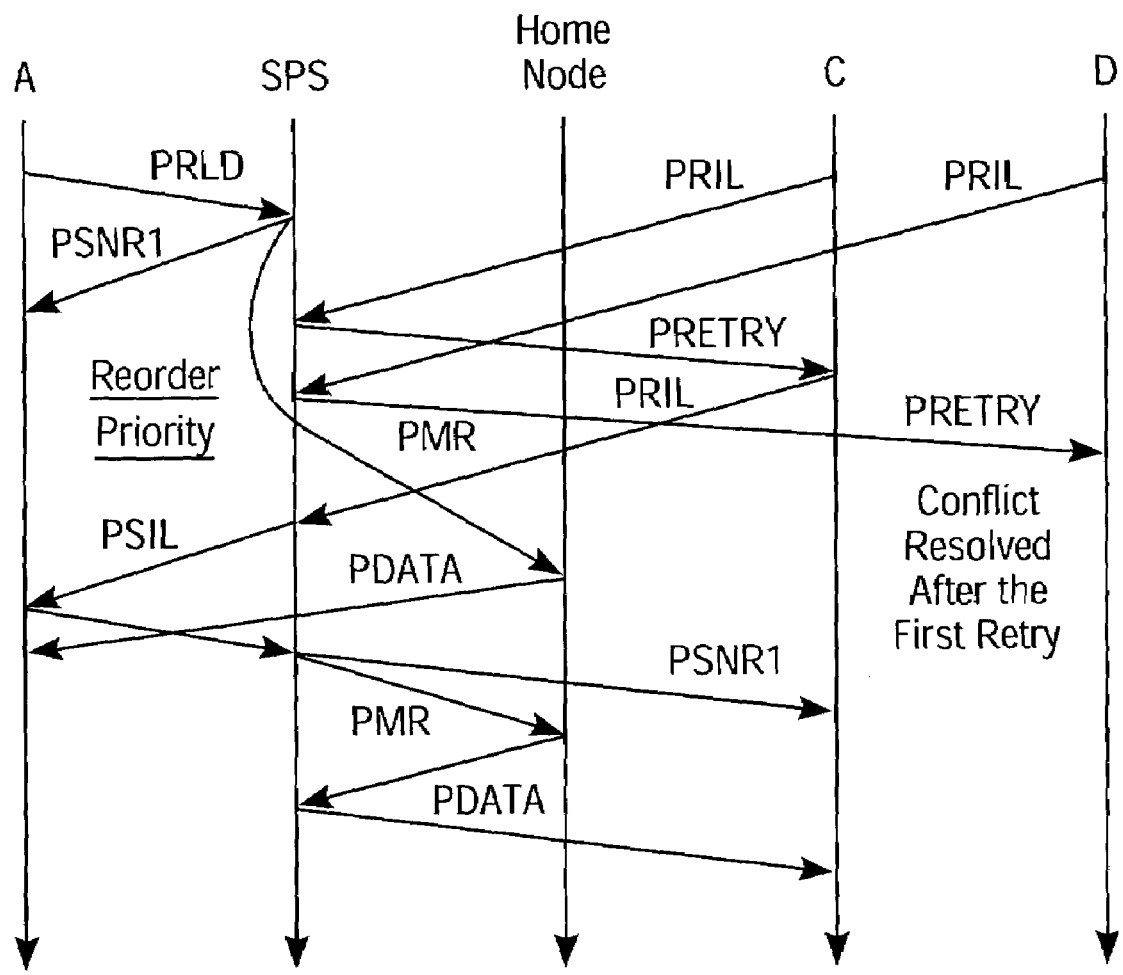
FIG. 3 illustrates a method for a timing diagram in accordance with an embodiment depicted in connection with FIG. 2.

FIG. 3 depicts a timing diagram in accordance with one embodiment of the invention. The timing diagram illustrates that the reordering of priority results in the PMR to be sent and the corresponding PRLD is completed since the conflict is resolved after the first retry.

Figure 4:
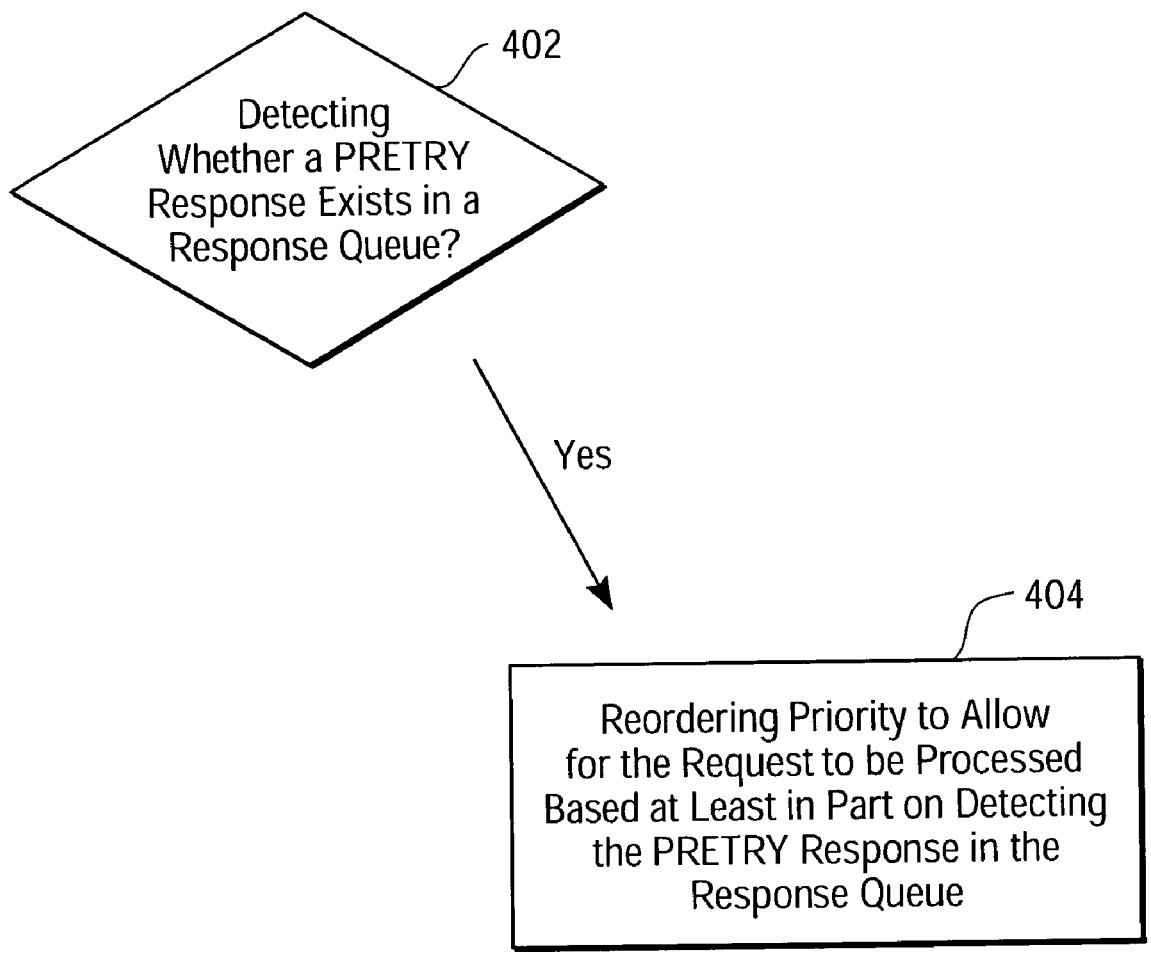
FIG. 4 illustrates a method for a flowchart in accordance with an embodiment.

FIG. 4 depicts a method of a flowchart in accordance with one embodiment of the invention. The flowchart depicts one embodiment of preventing the live-lock situation for a multinode system. First, detecting whether a PRETRY response exists in a response queue, as illustrated by decision block 404. If so, reordering priority to allow for the request to be processed based at least in part on detecting the PRETRY response in the response queue. Thus, this results in preventing live-lock because the PMR s sent and the corresponding PRLD is completed since the conflict is resolved after the first retry.

While the invention has been described with reference to specific modes and embodiments, for ease of explanation and understanding, those skilled in the art will appreciate that the invention is not necessarily limited to the particular features shown herein, and that the invention may be practiced in a variety of ways that fall under the scope and spirit of this disclosure. The invention is, therefore, to be afforded the fullest allowable scope of the claims that follow.

The invention claimed is:

1. An apparatus comprising:
   a first queue to store a plurality of responses;
   a second queue to store a plurality of requests;
   a decoder coupled to detect whether one of the plurality of responses stored in the first queue is of a predetermined type, wherein the one response would cause a retry; and
   a control logic coupled to reorder a priority to allow for a request stored in the second queue to be issued before the predetermined response, wherein the reordering avoids the retry.

2. The apparatus of claim 1 further comprising a multiplexer, coupled to the first and second queue, to forward either the response or request based at least in part on the control logic.

3. The apparatus of claim 2 wherein the first queue is an outbound response queue.

4. The apparatus of claim 1 wherein the second queue is an outbound request queue.

5. The apparatus of claim 1 wherein the predetermined type is a PRETRY response.

6. The apparatus of claim 5 wherein the control logic reorders priority if the second queue is not empty and the PRETRY response is at a top of the first queue.

7. The apparatus of claim 1 wherein the apparatus is a scalability port switch (SPS) of a chipset.

8. The apparatus of claim 6 wherein the apparatus is to coupled to a request/response channel.

9. The apparatus of claim 1 wherein the request is a Port Memory Read (PMR) request.

10. The apparatus of claim 9 wherein the apparatus is to prevent a live-lock situation to allow the multiplexer to forward the PMR before the PRETRY response to the request/response channel.

11. A method comprising:
    storing a plurality of responses;
    storing a plurality of requests;
    decoding whether one of the plurality of responses is a PRETRY response; and
    processing one of the plurality of requests before processing the PRETRY response.

12. The method of claim 11 wherein processing comprises generating a signal to a multiplexer for forwarding the one of the plurality of requests to a request/response channel.

* * * * *